Sept. 23, 1958     G. B. ELLIS     2,853,676
DRY BATTERY CAPACITY PREDICTOR
Filed Nov. 17, 1955     2 Sheets-Sheet 1
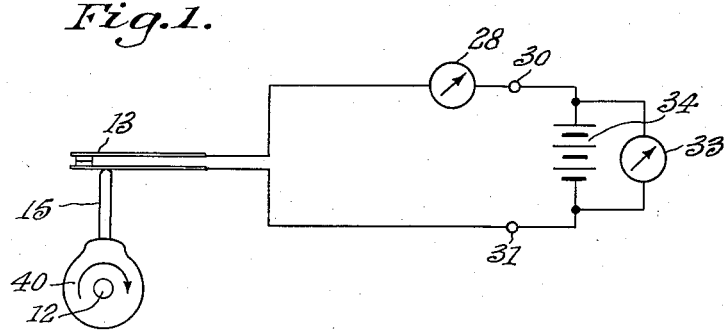
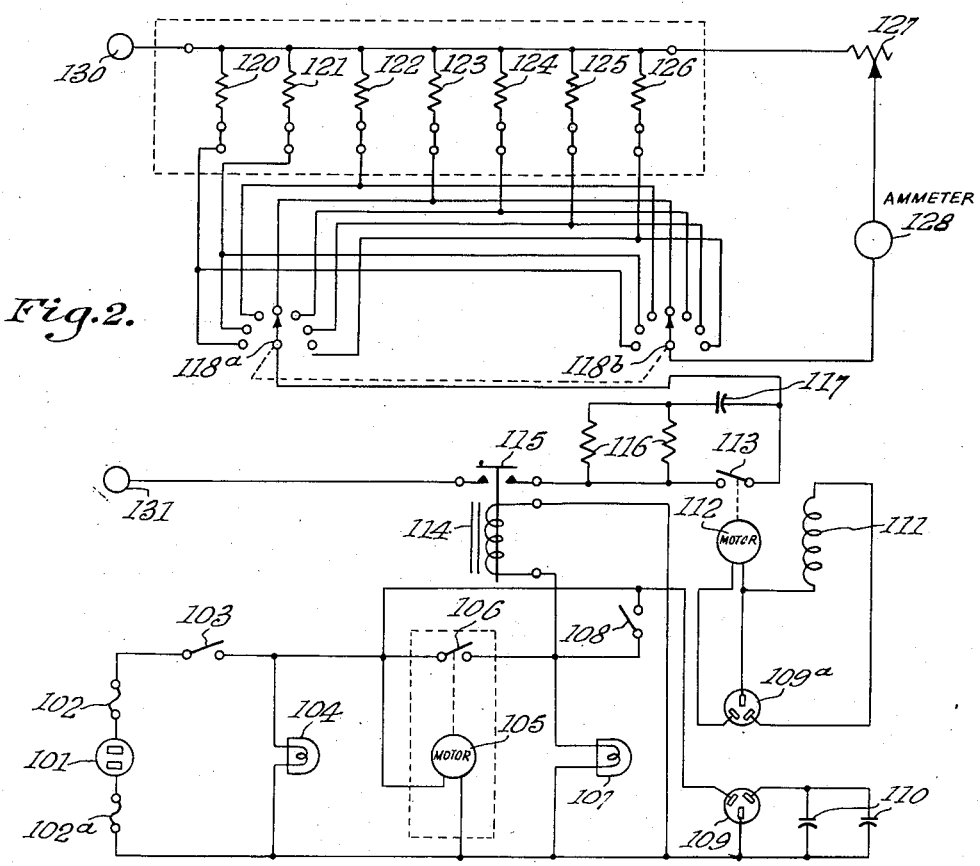
INVENTOR.
Grenville B. Ellis
BY
Harry M. Saragovitz
ATTORNEY Sept. 23, 1958  G. B. ELLIS  2,853,676
DRY BATTERY CAPACITY PREDICTOR
Filed Nov. 17, 1955  2 Sheets-Sheet 2

INVENTOR.
Grenville B. Ellis
BY
Harry M. Saragovitz
ATTORNEY

United States Patent Office 2,853,676
Patented Sept. 23, 1958

2,853,676
DRY BATTERY CAPACITY PREDICTOR

Grenville B. Ellis, Easthampton, Mass., assignor to the United States of America as represented by the Secretary of the Army Application November 17, 1955, Serial No. 547,592

3 Claims. (Cl. 324—29.5)

(Granted under Title 35, U. S. Code (1952), sec. 266)

The invention described herein may be manufactured and used by or for the Government for governmental purposes, without the payment of any royalty thereon.

This application is a continuation-in-part of my co-pending application, Serial No. 280,156, filed April 2, 1952, and now abandoned, for Dry Battery Capacity Predictor.

This invention relates to dry cell battery testers. More particularly, the present invention relates to a means for measuring the available capacity remaining in a dry cell battery and a method for performing such a measurement.

Another object of the invention is to provide a method and apparatus of testing dry batteries based on the activity of the depolarizer.

Dry cell battery testers have, heretofore, been of the loaded voltmeter type. Such a tester gives an indication of the immediate condition of the battery but does not indicate or predict the available capacity or further ability of the battery to supply the load. As a result, the important factor of residual capacity has not, heretofore, been indicated.

It is, therefore, a primary object of this invention to provide a means for measuring the residual capacity remaining in all types of dry cell batteries.

It is a further object to provide a method for performing a measurement on a dry cell battery that results in a direct reading in percentage terms of available capacity remaining in the dry cell battery.

It is a further object to provide a completely self-contained, portable tester for rapidly checking residual capacity remaining in dry cell batteries. Another object is to provide a method and apparatus for predicting the remaining capacity in all types of dry cell batteries by establishing initial test conditions for each type of battery. Another object is to test the dry cell without substantially discharging or injuring the cell. Another object is to provide a method of testing batteries in which the test data for the particular battery is affixed on the battery itself so that initial test settings can be reproduced at a later date.

Many attempts have been made heretofore to devise testing mechanisms for predicting the available capacity left in a dry cell battery. For example, the loaded voltmeter type test was believed to give an indication of the residual capacity. However, when a battery was subjected to this test and then tested by a short circuit amperage or flash current method, there was no correlation between the voltage and current values. Quite often where the loaded voltmeter test would show a 10 percent change, the flash current test might show an 80 percent change in the battery.

The principle of operation of the present invention is the utilization of depolarizer measurements. A dry cell is usually composed of an anode and a cathode, said cathode being the electrode that provides depolarizing action by liberating or supplying oxygen during the reaction. The tester of the present invention employs a method of testing dry batteries based on the activity of the depolarizer. To indicate depolarizer activity a pulsating short circuit is placed across the battery being tested and the cell is allowed to recover. The meter indicates the average current. The amount and rate of recovery depends upon the activity of the depolarizer. A depolarizer with normal activity will result in a higher average current and a sluggish depolarizer will result in a lower average current.

It is noted that a new fresh battery has a high rate of depolarizing action or high liberation. As the battery ages, it loses capacity and its depolarizing activity lessens indicating the relationship between residual capacity and depolarizing activity. In order to measure this correlation, a method and apparatus of periodically short-circuiting the battery is provided in order to measure the recovery or depolarizing activity of the battery. This method is effected by short-circuiting the dry cell battery to be tested, at a predetermined rapid rate to permit intervals of recovery between shorted intervals, to be measured on an integrating or damped ammeter. This method clearly indicates the difference between the available capacity in a fresh and a discharged battery, the correlation of these readings indicating an accuracy of prediction of an extremely high order of the actual capacity remaining in the battery. The time for such a reading takes a short period. The type of prediction applies equally well to either high or low voltage batteries requiring only modifications of the range of the short circuit indicator meter used or the periods of short circuit.

In order to perform such tests as described above, a means for short circuiting the battery at a chosen rate is depicted in the attached drawings in which:

Figure 1 is a simplified circuit showing the principles of operation for measuring the available capacity remaining in a dry cell battery;

Figure 2 is a schematic circuit diagram of the testing circuit embodying the present invention as utilized in test set TS-751/U;

Figure 3:
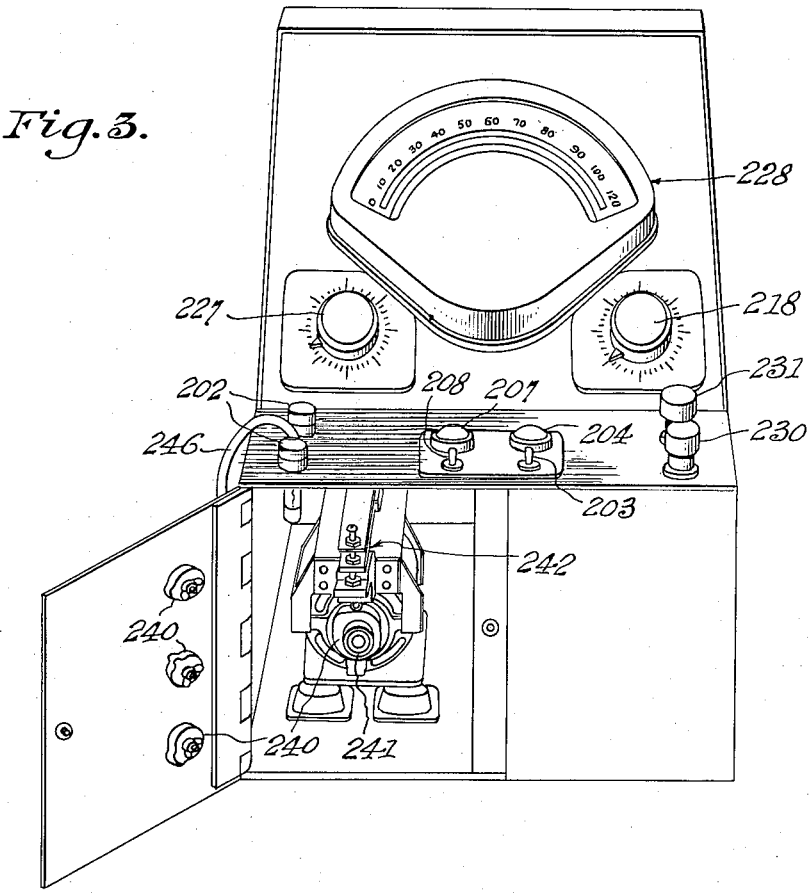
Figure 3 is an overall view of the exterior of test set.

The operation of the present invention can be readily understood when taken in connection with the following explanation of the theory of the mechanism of dry cell batteries.

Fundamentally, the dry cell battery most used today, the LeClanche cell consists of two electrodes dipping into a solution essentially consisting of ammonium and zinc chloride. One of those electrodes, the positive, to which electrons flow through the external circuit, is manganese dioxide. The other electrode, the negative which pumps electrons into the external circuit is metallic zinc.

Metallic zinc in contact with an aqueous solution exhibits a tendency to go into solution, thereby releasing two electrons for each zinc atom as dissolved:

$$Zn \rightarrow Zn^{++} + 2e \qquad (1)$$

This reaction will proceed to the right only if provisions are made to remove both zinc ions and electrons from the zinc electrode. Since the aqueous solution is, according to Faraday's law, very nearly if not exactly, a perfect electronic insulator, the electrons can leave the zinc only if the external circuit is closed and if, at the positive terminal of this circuit, the electrons can find an electron "sink," viz. an electron acceptor. As for the zinc ions, which also must leave the zinc electrode if the electrons are to leave, they obviously cannot leave by the external circuit and their removal from the metallic zinc electrode must be by diffusion into the aqueous solution and hence to a suitable absorbent.

In discussing the mechanism of ideal dry cell reaction, it is convenient to consider the manganese dioxide as an acid reservoir in which both the electrons and the zinc ions of Equation (1) are simultaneously absorbed when the external circuit is closed. On this basis the reaction at the manganese dioxide may be written as $$2MnO_2 + 2e + Zn^{++} \rightarrow Mn_2O_3 \cdot ZnO \qquad (2)$$

Equation 2 leads obviously to the concept that a satisfactory dry cell depolarizer (the manganese dioxide electrode) serves a dual function; the simultaneous absorption of electrons entering externally from the load and zinc ions entering internally by diffusion through the aqueous interface separating the depolarizer from the metallic zinc electrode.

The overall cell reaction then is given by the sum of Equations 1 and 2

$$2MnO_2 + Zn \rightarrow Mn_2O_3 \cdot ZnO \qquad (3)$$

Considering now the functions of the electrolyte and the paste in a dry cell, the electrolyte is usually a solution of ammonium and zinc chlorides and serves the purpose of furnishing a path for positive ions required by the manganese dioxide for the discharge reaction. The fundamental, basic function of the paste is to prevent direct electronic contact between the mix and the zinc while allowing relatively free ionic movement. This liquid interface, according to Faraday's law is a near perfect electronic insulator, forcing electrons liberated by the solution of zinc atoms to move to the manganese dioxide through an external circuit.

When a new battery remains on the shelf for an extensive period, it tends to dry resulting in a supersaturated solution of electrolyte in the cell. This in turn causes the crystallization of zinc and ammonium chlorides in the solution thereby forming an internal electronic path between the zinc and the manganese dioxide which is equivalent to an external drain on the battery. In addition, the crystallization decreases the surface lattice space for the zinc ions to diffuse into the manganese dioxide.

In considering now what occurs when a battery has been in use, it should be understood that the mechanism shown in Equations 1, 2 and 3 refer to ideal conditions of discharge where the rate of discharge is such that the flow of external electrons can be balanced by the internal rate of diffusion of zinc ions being generated at the anode. If the external resistance is low, electrons enter the mix faster than zinc ions can enter by diffusion and under these conditions of heavy charge, either positive hydrogen ions or positive ammonium ions are absorbed by the manganese dioxide to maintain electrostatic neutrality with the incoming electron in accordance with the following reaction:

$$2MnO + 2e + 2H^+ \rightarrow Mn_2O_3 \cdot H_2O \qquad (4)$$

$$2MnO_2 + 2e + 2NH_4 \rightarrow Mn_2O_3 \cdot H_2O + NH_3 \qquad (5)$$

When the ammonium chloride concentration is high as in a fresh cell and the ammonia as $NH_3$ is low, the ammonia combines with water and ammonium and hydroxyl ions are produced. As the amount of ammonia increases, there is formed in the cell $ZnCl_2 \cdot 2NH_3$ and $Zn(OH)Cl$. These reactions tend to decrease the vitality of the cell and to decrease its depolarizing activity.

Probably the most important factor determining the activity and recovery of a battery is the ability of the zinc to go into solution rapidly and in sufficient quantities to provide electrons for the reduction of the depolarizer, manganese dioxide. If for reasons of drying or crystallization, the tendency of the zinc to go into solution is decreased or the space for the zinc ions to diffuse into the depolarizing mix becomes smaller, the reduction of the manganese dioxide proceeds at a slower rate and the total amount reduced is less resulting both in lower current produced and slower recovery.

When a dry cell battery is tested by the present invention, the result is compared to the result of a like fresh battery tested by the present invention under identical conditions. As the fresh battery is periodically short circuited, it approaches a peak flash current value during each interval that circuit is closed and during the interval that the circuit is open, it recovers completely. On the other hand, when the used or old battery is tested by the present invention, due to drying and the other reasons set forth hereinabove, it does not reach the flash current peak of a like fresh battery, it increases in flash current at a slower rate and it does not fully recover during the open circuit intervals. It is therefore to be seen that the depolarizing activity of a dry cell is directly related in turn to both the quantity of current produced by the cell and the rate of recovery of the cell.

Referring in greater detail to the drawings, in Figure 1 a dry cell battery 34 to be tested is connected in series with an integrating meter 28, such as a damped ammeter, and a periodic short circuiting switch 13. Said short circuiting switch being any device which will periodically short circuit the battery being tested through said integrating meter, for example, there is shown a motor shaft 12 which rotates cam 40 to push rod 15 which operates contacts 13. Terminals 30 and 31 are provided for connecting the battery to the tester. If desired, a voltmeter 33 may be connected across the battery to indicate the battery voltage during the testing.

Figure 2 shows a schematic circuit diagram of the complete test set as utilized in practice. This circuit provides a test interval timer for completing the test circuit to permit short circuit cycling of the battery during a predetermined period and opening the test circuit for a predetermined "off" period. If desired, the battery under test can be changed during the open period. In practice, it has been found that an "on" cycling period of 10 seconds and an "off" period of 20 seconds has been found to be optimum. Thus, the cell is periodically discharged for short rapid periods during the 10 second test interval and the cell is allowed to rest for 20 seconds; however, other periods may be used. As will be described later, the test set provides adjustable short circuit periods for batteries of different types. This adjustment is accomplished by changing the timing cam utilized for actuating the short circuiting switch. The particular cam to be utilized for each type cell is designated for that particular battery. Referring to Figure 2, the supply voltage is applied to the test set by plug 101. Fuses 102 and 102A are connected in series with the supply and closing the power switch 103 energizes the test interval timer motor 105, and energizes the pilot bulb 104. Motor 105 periodically actuates switch contacts 106. Closure of switch 106 completes the circuit to control relay 114 which actuates contact 115. Indicator bulb 107 indicates energization of control relay 114. Switch 108, connected across contacts 106, provides means for manually bypassing the timer switch and completing the test circuit. The battery under test is connected to terminals 130 and 131. The battery test circuit is traced from terminal 131, contacts 115, 113, switch 118a, 118b, meter 128, calibrating potentiometer 127 to terminal 130. Resistors 120 to 126 selectively shunt the meter 128 depending upon position of range switch 118a and 118b. Resistors 120, 121, 122, 123, 124, 125 and 126 have the valves of .08, .04, .02, .01, .005, .002 and .001 ohm respectively. Cycling switch motor 112, described later, periodically operates contact 113 to rapidly short the battery through the meter. The period of closure of contact 113 depends upon selection of the particular cam which operates this switch. Receptacle 109 receives plug 109A which supplies energy for the motor 112. Resistors 116 with condenser 117 reduces arcing at switch contacts 113. Thus it is seen that timing motor 105 which operates switch 106, completes the test circuit for the predetermined interval and permits cycling motor 112 which operates switch 113 to periodically discharge the battery through the motor for the short test cycles.

Figure 3 shows an overall exterior view of the test instrument, as utilized. The battery tester has four controls. Power switch 203 controls the application of A. C. power to the synchronous motor 112 which operates the short circuiting switch 113, Fig. 2. The pilot light 204 indicates when the switch is in the "on" position. Adjacent to the power switch is timer switch 208. When this switch is in the "on" position the interval automatic timer circuit is in operation and the battery test circuit operates thru repetitive intervals of 10 seconds "on" and 20 seconds "off." When this switch is in the "off" position the automatic timer switch is shorted out and the test cycling circuit is closed continuously. The pilot light 207 indicates during the 10 second intervals when the automatic timer is in operation and also indicates continuously when the automatic control is shorted out by timer switch 208. Calibration control 227 is a 5-ohm non-linear potentiometer which is set to a certain number on its dial with the reference figure determined for a fresh battery as found in the test chart, described later. Range switch 218 is used to select the proper current range according to the type of battery being tested. Included with the tester are four cams 240 each marked with different color codes for identification. These cams are for use on the shaft of the cycling motor 241 for varying the short circuit cycling periods.

Figure 4:
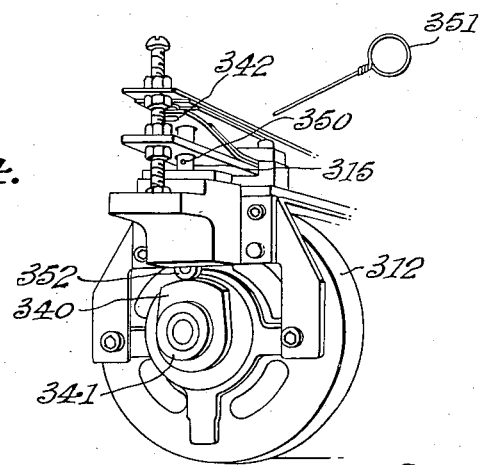
Figure 4 is a detailed drawing of the motor operated cam switch.

Referring to Figure 4 there is shown in detail the motor operated cam switch. Roller 352 rolls on cam 340 which pushes rod 315 to close switch contacts 342. Knurled nut 341 is provided to permit removal of cam 340 and installation of another cam. This is accomplished by moving the cam in a position as shown in the figure, inserting pin 351 in hole 350 then removing nut 341, changing cams, re-assembling and removing the pin.

A test is performed by connecting the battery under test to terminals 230—231. The controls are then set to the proper position as indicated for that particular battery and the proper cam is inserted. The power is turned on and the timer switch placed in the automatic position. During the 10 second "on" period the battery is periodically discharged for the short periods depending upon the particlar cam selected. The 20-second "off" period allows the operator to change batteries if more than one of the same type and lot is being tested. When the timer closes the circuit, the meter will indicate. The reading should be taken within the first three seconds after the circuit closes. It will be noted that, in most cases, during the first few seconds the meter pointer comes to rest at one point and as the test continues the pointer will begin to drop off. The meter reading will indicate the percentage of the original service in the batter still available at the time of test. The battery should be tested at temperatures between 60° F. and 80° F.

An illustration of the table showing the proper setting of the test controls for the particular types of batteries under test is shown below:

*Battery test data*

| 1 | 2 | 3 | 4 | 5 | 6 | 7 | 8 | 9 |
|---|---|---|---|---|---|---|---|---|
| Jan Battery Type No. | | | | Test No. | | | | Section Tested |
| BA-2 | | | | Green | X | A | 40 Hrs | |
| BA-8 | | | | Neutral | X | A | 73 Hrs | |
| BA-9 | | | | Black | X | B | 97 Min | |
| BA-15A | | | | Neutral | X | E | 32 Hrs | |
| BA-23 | | | | Neutral | X | E | 38 Hrs | |
| BA-26 | | | | Neutral | X | D | 115 Hrs | (45 v.). |
| BA-27 | | | | Neutral | X | E | 400 Min | (−4.5 v.). |
| BA-28 | | | | Green | X | B | 120 Min | |

Column 1 in the table indicates the battery type number;

Column 2 indicates the service at the time of manufacture which is the guaranteed life specified in the contract for the production of the battery.

The information for columns 2, 3 and 4 is not shown in the table. These figures are supplied by the battery manufacturer and may appear on the battery itself or carton or shipping documents for a particular lot. These figures will not be the same for the same type of battery produced by different manufacturers or for different productions of the same type of battery by different manufacturers. They may vary according to its construction, type and grade of ore, and types of mixes used at the time of production of the battery which makes it necessary for the manufacturer to establish these figures at the time of producion.

Column 3 is the setting number for the calibrated potentiometer and is obtained by selecting a limited number of batteries (e. g., 25) from a day's production. Generally, these batteries should be selected in small groups at random intervals. Each battery is then tested. A battery is connected to the tester and the potentiometer is set to approximately 70 on its dial. The range selector switch is then adjusted until the meter reads somewhere between 50 and 125 on the meter scale. The potentiometer is now adjusted so the meter reads 100 percent. The range selector switch should require no further adjustment for the balance of the batteries to be tested. The readings should be taken during the first 3 seconds after the circuit closes. It will be noted that when the circuit closes the meter pointer comes to rest and after about 2 or 3 seconds the pointer begins to decline after the battery discharges. Readings should not be taken while the pointer is declining. The test is then made on the 25 batteries and the potentiometer reading is adjusted to read 100 percent for each battery. The potentiometer readings are recorded for each battery and then averaged. In some cases it may be necessary to use a different cam other than that shown in column 5 when making the initial potentiometer and range selection settings. If it is not possible to find a potentiometer setting (above 50 on its dial) and a range selector setting will allow an adjustment to the 100 percent point, on the meter scale, a different cam should be used. If the potentiometer setting at full scale will not reach 100 percent on the meter scale for the lowest range selector setting, another cam with longer "on" time should be tried. If later production checks are not more than 5 points off in either direction a new reference for column 3 is not required. If the differences are greater than 5 points, the setting should be changed accordingly.

Column 4 is the range switch setting as described above.

In column 5 there is indicated the color code symbol of the cam to be employed. The cycling motor which drives the cam rotates at a speed of 1800 revolutions per minute. The table below shows the relationship between the cam color code, as shown in the Battery Test Table, and the characteristics of the cam. The physical angle of the cam is shown in column 1 and the electrical angle over which the contacts are closed is given in column 2. The difference between the physical angle and the electrical angle is due to the contacts closing slightly before and remaining closed slightly after the maximum cam amplitude.

| Color | Physical Cam Angle, degrees | Angle over which Contacts are closed per revolution, degrees |
|---|---|---|
| Red | 30 | 42 |
| Green | 60 | 76 |
| Black | 90 | 108 |
| Neutral | 180 | 196 |

Columns 6 and 7 indicate the adapter kit and adapter plug to be used for connecting the particular battery to the tester.

Column 8 indicates the acceptable service of the battery in use.

Column 9 is the section of the battery to be tested.

While there has been described what, at present, is considered to be a preferred embodiment of the invention, it will be understood by those skilled in the art that various changes and modifications may be made herein without departing from the invention, and it is, therefore, aimed in the appended claims to cover all such modifications as fall within the spirit and scope of the invention.

What is claimed is:

1. A testing device for determining the capacity remaining in a battery comprising an integrating ammeter, a periodically actuated switch means connected in series with said battery and said ammeter to cause short circuit battery current to flow through said ammeter for an interval of such short duration that substantial discharge of said battery is prevented, when upon opening the circuit for a short interval the battery is permitted to recover to a value dependent upon the condition of the battery whereby the ammeter quantitatively indicates the short circuit current and recovery ability of the battery over a number of continuous uniform successive short cycles.

2. An apparatus for determining hte residual capacity remaining in a battery comprising an integrating ammeter, switch means connected to periodically short circuit said battery through said ammeter, said switch means having a replaceable rotary cam for closing the switch for various predetermined short intervals of uniform duration dependent upon the particular cam utilized, said ammeter being calibrated to provide a substantially full scale deflection for the total capacity and a deflection for said residual capacity substantially in the same ratio to said full scale deflection as the ratio of said residual to said total capacity.

3. An apparatus as in claim 2 wherein said ammeter is provided with a variable calibrated shunt resistor for testing various types of batteries.

References Cited in the file of this patent

UNITED STATES PATENTS 1,205,343    Goodwin _____ Nov. 21, 1916

OTHER REFERENCES

"Primary Batteries," by G. W. Vinal, publication by John Wiley and Sons Inc., 1950, pages 109, 110.